(12) United States Patent
Lin et al.

(10) Patent No.: US 11,950,688 B2
(45) Date of Patent: Apr. 9, 2024

(54) GLUE-FREE MAKEUP BRUSH WITH CLAMPING ASSEMBLY

(71) Applicant: BEAUTY YAURIENT COSMETICS ACCESSORIES(SHENZHEN) CO., LTD., Shenzhen (CN)

(72) Inventors: Yuju Lin, Shenzhen (CN); Jinbo Huang, Shenzhen (CN)

(73) Assignee: BEAUTY YAURIENT COSMETICS ACCESSORIES(SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 18/465,693

(22) Filed: Sep. 12, 2023

(65) Prior Publication Data

US 2023/0413983 A1    Dec. 28, 2023

(30) Foreign Application Priority Data

May 29, 2023    (CN) .......................... 202321337583.8
Jul. 18, 2023    (CN) .......................... 202310880290.2

(51) Int. Cl.
| A46B 7/04 | (2006.01) |
| A45D 34/04 | (2006.01) |
| A46B 5/00 | (2006.01) |
| A46B 5/02 | (2006.01) |
| A46B 9/02 | (2006.01) |

(52) U.S. Cl.
CPC ............ *A46B 7/042* (2013.01); *A45D 34/042* (2013.01); *A46B 5/0095* (2013.01); *A46B 5/02* (2013.01); *A46B 9/021* (2013.01); *A45D 2200/10* (2013.01); *A46B 2200/1046* (2013.01)

(58) Field of Classification Search
CPC ......... A46B 7/042; A46B 5/0095; A46B 5/00; A46B 5/02
See application file for complete search history.

(56) References Cited

U.S. PATENT DOCUMENTS

2023/0017670 A1 *    1/2023    Hwang ................... A46B 3/08

FOREIGN PATENT DOCUMENTS

CN          204861716 U      12/2015
KR          20220138734 A  * 10/2022

* cited by examiner

*Primary Examiner* — Shay Karls

(57) ABSTRACT

A novel glue-free makeup brush with a clamping assembly, including a handle, a brush head, and a connecting piece. The brush head includes bristles and a mounting piece, and is arranged on an upper end of the handle. The bristles are arranged on the mounting piece, and the mounting piece is clamped with the connecting piece. An upper end of the clamping assembly, formed by a first clamp and a second clamp, is provided with a groove, in which the mounting piece is arranged. In this way, the brush head can be arranged on the clamping assembly without using glue. The handle is removably connected with a sleeve of the connecting piece.

8 Claims, 10 Drawing Sheets

GLUE-FREE MAKEUP BRUSH WITH CLAMPING ASSEMBLY

CROSS-REFERENCE TO RELATED APPLICATIONS

This application claims the benefit of priority from Chinese Patent Application Nos. 202310880290.2 and 202321337583.8, filed on Jul. 18, 2023 and May 29, 2023, respectively. The content of the aforementioned application, including any intervening amendments thereto, is incorporated herein by reference in its entirety.

TECHNICAL FIELD

This application relates to makeup tools, in particular to a glue-free makeup brush with a clamping assembly.

BACKGROUND

Makeup brush is one of the commonly-used makeup tools in our daily life. There are currently a wide variety of commercially-available makeup brushes with different functions. However, most of the traditionalmakeup brushes adopt an integral design, which will be discarded when the bristles can't be used, resulting in a waste of material resources and high productioncost. Therefore, these makeup brushes do not meet the requirements of greenproduction. Chinese patent application No. 201520504549.4 provides a makeup brush, including a handle and a brush tube, where an upper end of the handle is a straight cylinder, and a lower end is configured as a cone tail. The straight cylinder is clamped with the brush tube, and then they are fixed with glue.

The existing makeup brushes have the following defects.
1. The use of glue for fixing is not eco-friendly, and there is a strong smell after solidified.
2. The handle and brush tube are fixed together with the glue, which makes the replacement of the handle inconvenient, resulting in a waste of material resources.

Therefore, it is urgently needed to design and develop a novel makeup brush product to solve the above problems.

SUMMARY

In view of the problems in the prior art, the present disclosure provides a novel glue-free makeup brush with a clamping assembly.

Technical solutions of the present disclosure are described as follows.

This application provides a makeup brush, including:
a handle;
a brush head; and
a connecting piece;
wherein, the brush head includes bristles and a mounting piece; the bristles are provided on the mounting piece;
the connecting piece is configured to connect the brush head with the handle, and the mounting piece is in snap-fit connection with the connecting piece;
the connecting piece includes a clamping assembly and a sleeve; the clamping assembly is arranged in the sleeve; the mounting piece is in snap-fit connection with an upper end of the clamping assembly, and an end away from the mounting piece of the sleeve is removably connected with the handle; and
the clamping assembly includes a first clamp and a second clamp, and the first clamp and the second clamp are removably connected to form an enclosed structure; an inner side wall of the first clamp and an inner side wall of the second clamp are each provided with a first groove; the first groove on the inner side wall of the first clamp is configured to form a circular mounting groove with the first groove on the inner side wall of the second clamp; and the mounting piece is clamped in the circular mounting groove.

In some embodiments, a lower end of the first clamp and a lower end of the second clamp are provided with an elastic piece; an outer side wall of the elastic piece is provided with a protrusion; an inner side wall of the sleeve is provided with a second groove and the protrusion of the elastic piece is clamped in the second groove.

In some embodiments, the inner side wall of the sleeve is provided with a boss, and an upper surface of the boss is flush with a side wall away from the bristles of the second groove.

In some embodiments, the lower end of the first clamp and the lower end of the second clamp are each provided with a notch running through the elastic piece. The notch is configured to increase an elasticity of a lower end of the clamping assembly and an elasticity of the elastic piece.

In some embodiments, the inner side wall of the first clamp is connected with a disc, and a side wall of the disc is provided with a third groove; the inner side wall of the second clamp is provided a convex ring; the convex ring is fitting with the third groove; and the convex ring is clamped in the third groove.

In some embodiments, an upper surface of the disc is flush with a side wall of the circular mounting groove away from the bristles; and the disc is configured to support the mounting piece.

In some embodiments, the mounting piece is round and the sleeve is cylindrical.

In some embodiments, the handle includes a first section and a second section; the first section is thicker than the second section; the first section and the second section are integrally formed. The first section is removably connected with the sleeve. The second section is cylindrical or in a truncated cone shape. An outer diameter of the second section is less than a minimum inner diameter of the sleeve, and the height of the second section is greater than the height of the sleeve.

In some embodiments, a top end of the handle is provided with an external screw thread, and a lower end of the sleeve is provided with an internal screw thread fitting the external screw thread, and the handle and the sleeve are threadedly connected through the external screw thread and the internal screw thread.

In some embodiments, a top of the handle is provided with a column; the external screw thread is located on an outer side wall of the column; the column is sleevedly provided with an O-ring, which is compressed when the handle and the sleeve are threadedly connected, thereby realizing the sealing between the handle and the sleeve.

In some embodiments, the sleeve includes a first sub-sleeve and a second sub-sleeve; the first sub-sleeve and the second sub-sleeve are removably connected to form an enclosed structure; the first sub-sleeve and the first clamp are integrally formed; and the second sub-sleeve and second clamp are integrally formed.

In some embodiments, the second sub-sleeve and the handle are integrally formed, and the first sub-sleeve is insertedly connected with the handle.

In some embodiments, the handle includes a first handle portion and a second handle portion, and the first handle portion and the second handle portion are removably connected to form an enclosed structure. The first sub-sleeve and the first handle portion are integrally formed, and the second sub-sleeve and the second handle portion are integrally formed.

In some embodiments, the first handle portion is provided with a clamping column; the second handle portion is provided with a clamping hole; and the clamping column extends into the clamping hole to enable snap-fit connection between the first handle portion and the second handle portion.

Compared to the prior art, the present disclosure has the following beneficial effects.

1. The brush head of the makeup brush provided herein includes bristles and a mounting piece; the clamping assembly includes the first clamp and the second clamp; the two clamps are connected to form an enclosed structure; upper ends of the two clamps are each provided with a first groove, and the two grooves together form a circular mounting groove; and the mounting piece is arranged in the mounting groove. In this design, the brush head can be mounted on the clamping assembly without the need of glue.
2. The inner side wall of the upper end of the sleeve is provided with a second groove, and lower ends of the two clamps are each provided with an elastic piece; the outer side of the elastic piece is provided with a protrusion; and the protrusion is clamped in the second groove, such that the clamping assembly is clamped on the sleeve to facilitate the replacement of the brush head.
3. The lower end of the sleeve is provided with an internal screw thread, and the upper end of the handle is provided with an external screw thread fitting the internal screw thread, such that the handle can be threadedly connected with the sleeve to facilitate the replacement of the handle.

Figure 1:
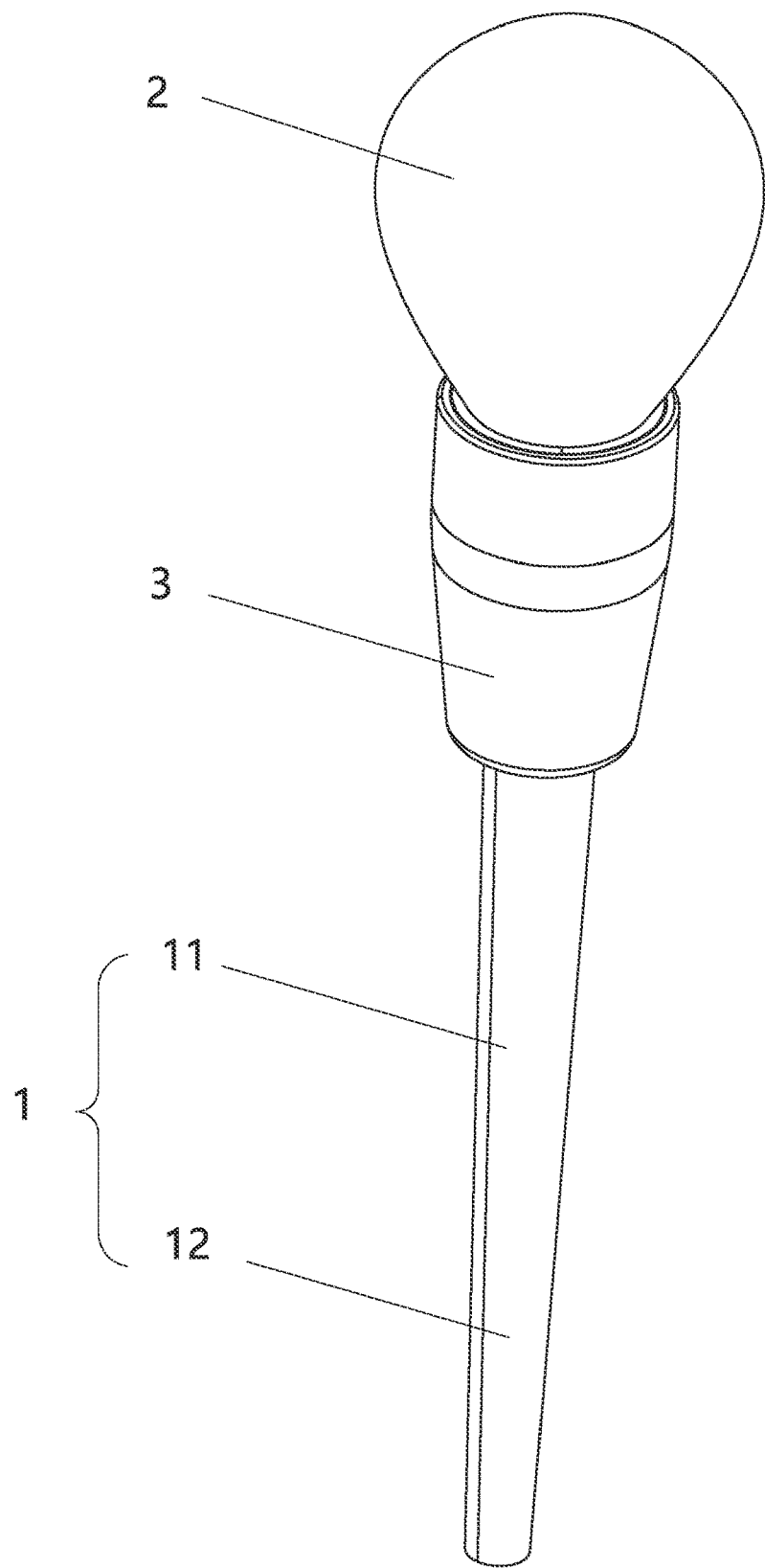
FIG. 1 is a perspective view of a glue-free makeup brush according to an embodiment of the present disclosure.

In the figures:
1, handle; 2, brush head; 3, connecting piece; 4, O-ring;
11, first section; 110, column; 111, external screw thread; 12, second section; 13, first handle portion; 131, clamping hole; 14, second handle portion; 141, clamping column;
201, bristle; 202, mounting piece;
310, clamping assembly; 311, first clamp; 3111, disc; 31111, third groove; 31112, first sub-disc; 3113, engaging section; 31113, second sub-disc; 3112, notch; 312, second clamp; 3121, convex ring; 313, mounting groove; 3131, first groove;
320, sleeve; 321, second groove; 322, internal screw thread; 323, boss; 324, first sub-sleeve; 325, second sub-sleeve;
330, elastic piece; and 331, protrusion.

DETAILED DESCRIPTION OF EMBODIMENTS

The present disclosure will be further described below with reference to the accompanying drawings and embodiments. It can be understood that the embodiments described herein are only to illustrate this application rather than limiting this application. It should also be noted that for simplified description, the accompanying drawings only show the relevant section of this application rather than the whole structure.

As used herein, unless otherwise expressly specified and limited, the terms "connection", "linkage" and "fixing" should be interpreted in a broad sense. For example, it can be "fixedly connection", "removable connection" or "integral connection"; it can be "mechanical connection" or "electrical connection"; it can be "direct connection" or "indirect connection through an intermediate medium"; it can be internal communication or interaction between two components. For those of ordinary skill in the art, the specific meaning of these terms can be understood in specific cases.

As used herein, unless expressly specified and limited, the phrase "the first feature is "above" or "below" the second feature" includes the direct contact or indirect contact therebetween. Moreover, "the first feature is "above" the second feature" includes "the first feature is directly above or diagonally above the second feature", or simply indicates that the first feature is at a higher level than the second feature. Similarly, "the first feature is "below" the second feature" includes "the first feature is directly below or diagonally below the second feature", or simply indicates that the first feature is at a lower level than the second feature.

In the description of this embodiment, the orientation or position relationship indicated by the terms "up", "down", "front", "back", "left", and "right" is based on the orientation or position relationship shown in the accompanying drawings. These terms are only for facilitating description and simplifying operation rather than indicting or implying that the devices or components must have a particular orientation or construction and operation in a particular orientation or construction. Therefore, these terms should not be regarded as the limitation of this application. Besides, the terms "first" and "second" are only used for distinguishment without other special meanings.

Figure 2:
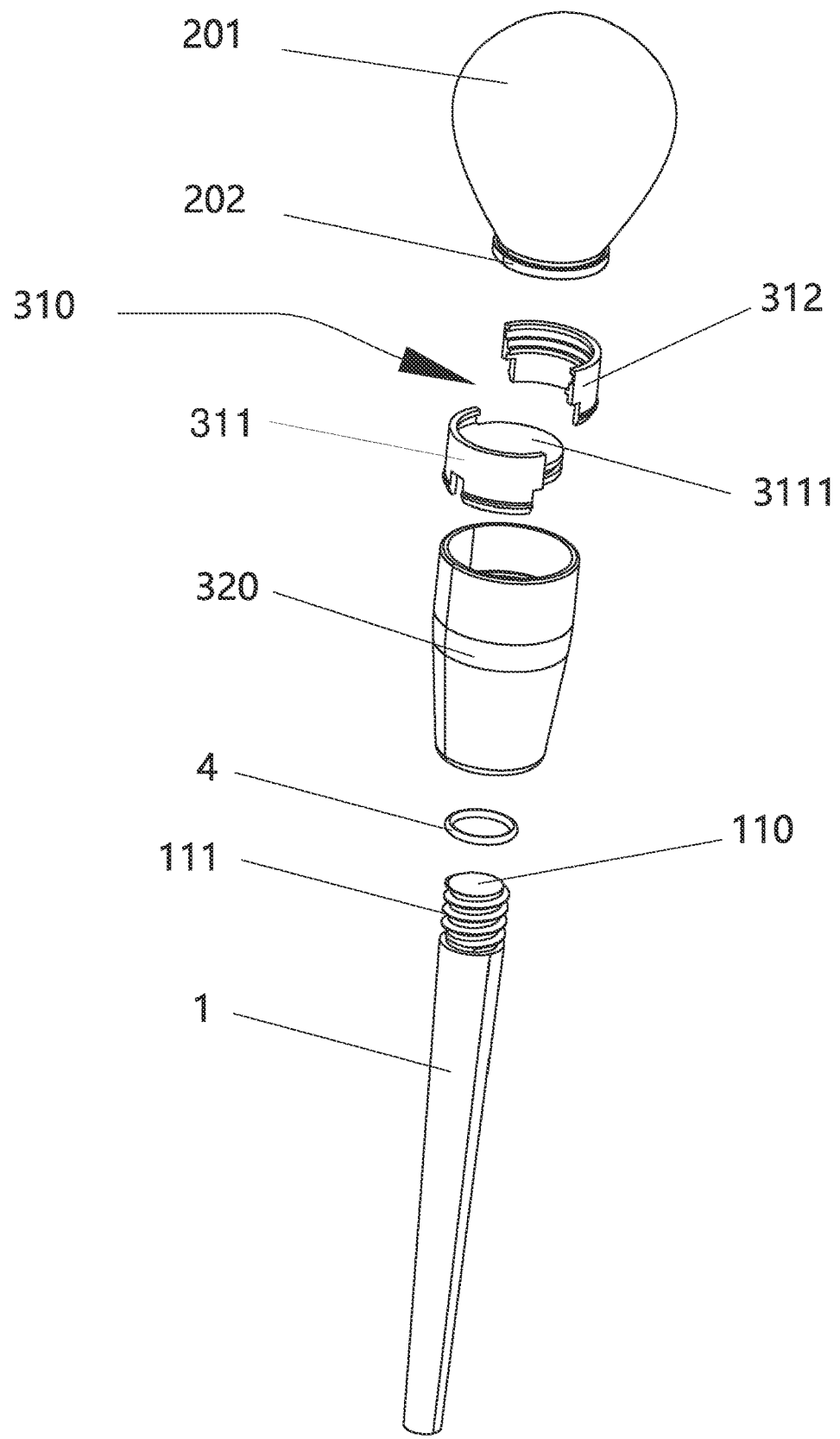
FIG. 2 is an exploded view of the glue-free makeup brush according to an embodiment of the present disclosure.
Figure 3:
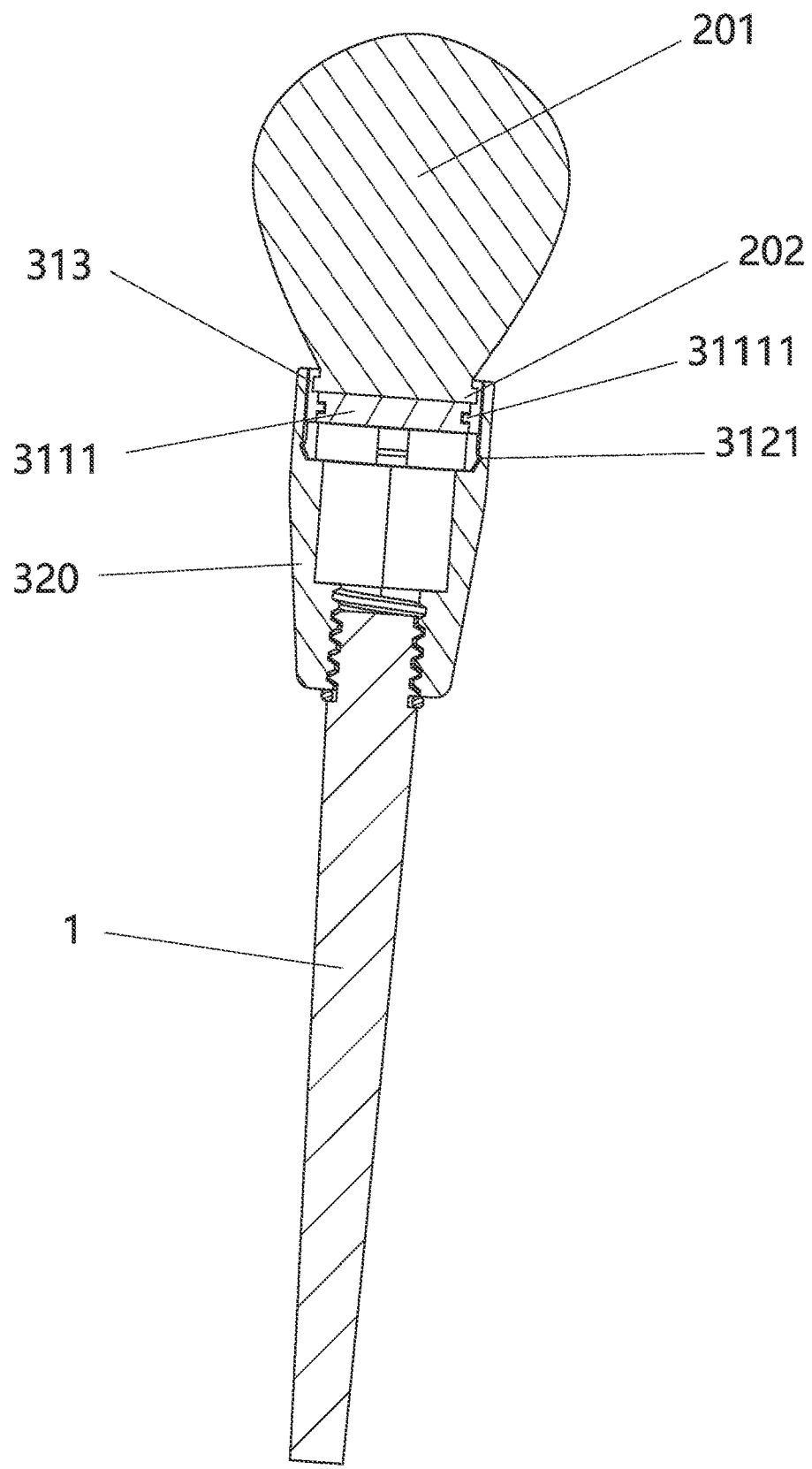
FIG. 3 is a sectional view of the glue-free makeup brush according to an embodiment of the present disclosure.

Referring to FIGS. 1-3, this application provides a novel glue-free makeup brush with clamping assembly, including a handle 1, a brush head 2 and a connecting piece 3, and the connecting piece 3 is configured to connect the brush head 2 with the handle 1, eliminating the use of glue for bonding; the brush head 2 includes bristles 201 and a mounting piece 202; the bristles 201 is arranged on the mounting piece 202 and the mounting piece 202 is in snap-fit connection with the connecting piece 3; the connecting piece 3 includes a clamping assembly 310 and a sleeve 320 and the clamping assembly 310 is set in the sleeve 320; the mounting piece 202 is in snap-fit connection with an upper end of the clamping assembly 310 and the handle 1 is removably connected with an end far away from the mounting piece 202 of the sleeve 320. The clamping assembly 310 includes a first clamp 311 and a second clamp 312; the first clamp 311 and the second clamp 312 are removably connected to form an enclosed structure; an inner side wall of the first clamp 311 and an inner side wall of the second clamp 312 are each provided with a first groove 311; the first groove 3131 of the inner side wall of the first clamp 311 is configured to form a circular mounting groove 313 with the first groove 3131 of the inner side wall of the second clamp 312; and the mounting piece 202 is clamped in the circular mounting groove 313.

In this application, the brush head 2 and the handle 1 are connected through the connecting piece 3 instead of the glue, which is more environmentally friendly; the mounting piece 202 is clamped in the mounting groove 313 formed by the first grooves 3131 of the first clamp 311 and the second clamp 312, so as to realize the clamping of the brush head 2 and the clamping assembly 310. When the brush head is needed to replace, remove the clamping assembly 310 from the sleeve 320 and open the first clamp 311 and the second clamp 312, then the mounting piece 202 of the brush head 2 can be moved directly from the first groove 3131; the mounting piece 202 is in snap-fit connection with the first groove 3131 of the first clamp 311, and the second clamp 312 is in snap-fit connection with the first clamp 311; the two first grooves 3131 are formed as a whole mounting groove 313 in order to position the second clamp 312 in the mounting groove 313; then the clamping assembly 310 of the brush head 2 is insertedly connected with the sleeve 320, in this way, the convenient replacement of the brush head 2 is completed. Besides, the handle and the sleeve 320 are removably connected for easy to replace the handle.

Referring to FIGS. 1-2, in this embodiment, an upper end of the first clamp 311 and an upper end of the second clamp 312 are each provided with the first groove 3131 so that the brush head 2 is arranged on the upper end of the clamping assembly.

Figure 7:
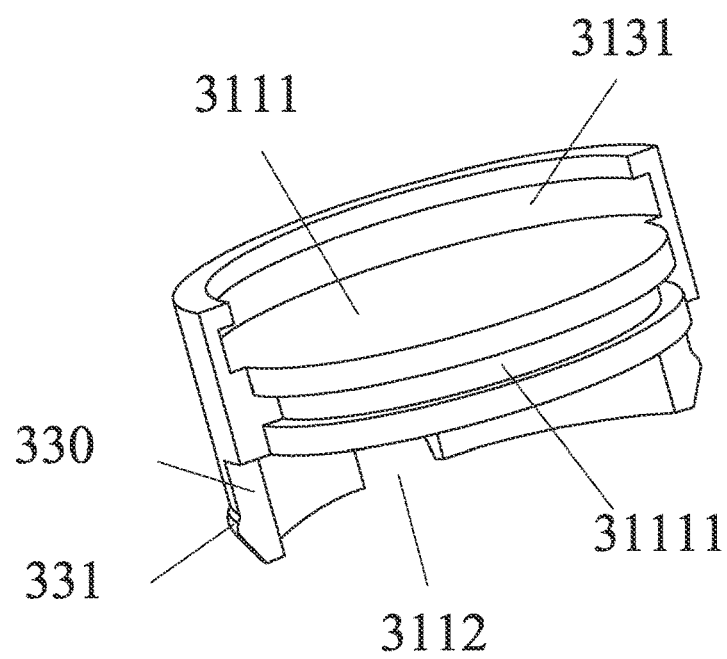
FIG. 7 is a perspective view of a first clamp according to an embodiment of the present disclosure.
Figure 9:
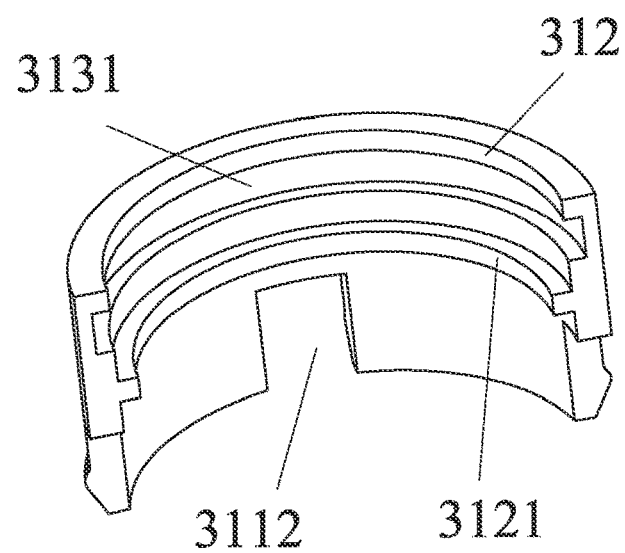
FIG. 9 is a perspective view of a second clamp according to an embodiment of the present disclosure.

Referring to FIG. 2, FIG. 7 and FIG. 9, a lower end of the first clamp 311 and a lower end of the second clamp 312 are each provided with an elastic piece 330, and an outer side wall of the elastic piece 330 is provided with a protrusions 331; an inner side wall of the sleeve 320 is provided with a second groove 321; the protrusion 331 is in snap-fit connection with the second groove 321 to realize the positioning of the clamping assembly 310 relative to the sleeve 320. In particular, the elastic piece 330 and the clamping assembly 310 are integrally formed, and the elastic piece 330 has a certain elasticity, in this way, when the lower end of the clamping assembly 310 and the elastic piece 330 are inserted into the sleeve 320, the elastic piece 330 will shrink and deform so that the elastic piece 330 can be extended into the sleeve 320, and the protrusion 331 on the elastic 330 can be clamped in the second groove 321 of the connecting piece 3; and then the elastic piece resets to prevent the clamping assembly 310 from falling out from the sleeve 320.

In this embodiment, the lower end of the first clamp 311 refers to an end away from the brush head 2 of the first clamp 311, and the lower end of the second clamp 312 refers to the end away from the brush head 2 of the second clamp 312; the second groove 321 is located at an upper end of the sleeve 320, which means the upper end of the sleeve 320 is in snap-fit connection with the elastic piece 330, and the lower end of the sleeve 320 and the handle 1 are removably connected.

Figure 4:
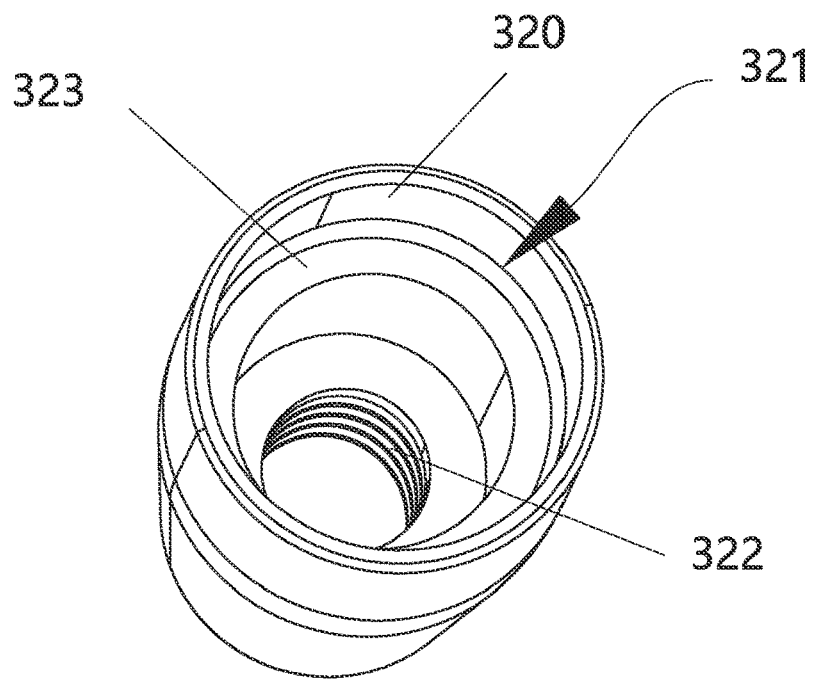
FIG. 4 is a top-down perspective view of a connecting piece according to an embodiment of the present disclosure.
Figure 6:
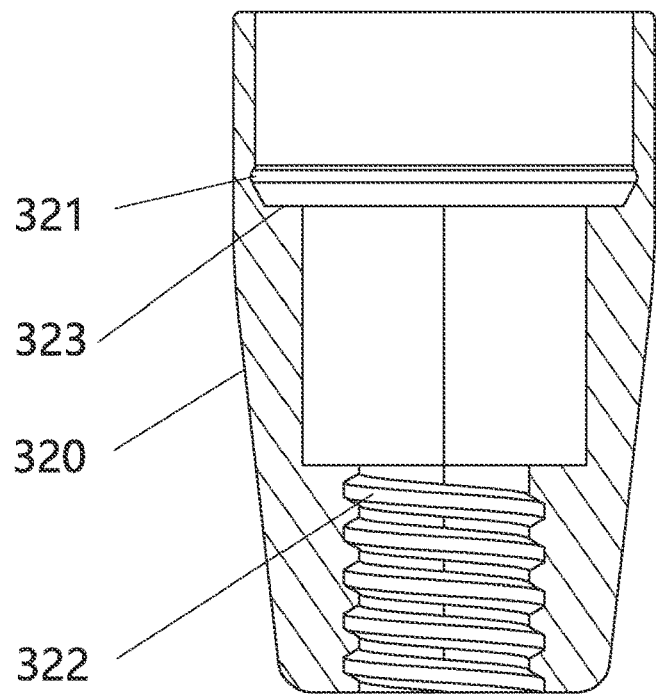
FIG. 6 is a sectional view of the connecting piece according to an embodiment of the present disclosure.

Referring to FIGS. 3-4 and 6, the inner wall of the sleeve 320 is provided with a boss 323, and an upper surface of the boss 323 is flush with a side wall away from the brush head 2 of the second groove 321; the boss 323 is configured to restrict the relative penetration distance between elastic piece 330 and the sleeve 320, in this way, after the protrusion 331 of the elastic piece 330 is in snap-fit connection with the second groove 321, it can't run through further so as to avoid the elastic piece 330 to cross the second groove 321.

Referring to the FIGS. 2, 7, and 9, the lower end of the first clamp 311 and the lower end of the second clamp 312 are each provided with a notch 3112; the notch runs through the elastic piece 330 and is configured to increase the elasticity of the lower end of the clamping assembly 310 and the elastic piece 330. In particular, the notch 3112 is set to help the elastic piece 330 shrink and deform more easily and penetrate into the sleeve 320, when the lower end of the clamping assembly 310 and the elastic piece 330 are inserted in the sleeve 320.

Referring to FIGS. 7 and 9, the inner wall of the first clamp 311 is connected with a disc 3111, and the side wall of the disc 3111 is provided with a third groove 31111; the inner wall of the second clamp 312 is provided with a convex ring 3121; the convex ring 3121 fitting the third groove 31111, and the convex ring 3121 is clamped in the third groove 31111 so as to realize the removable enclosure of the first clamp 311 and the second clamp 312.

Figure 8:
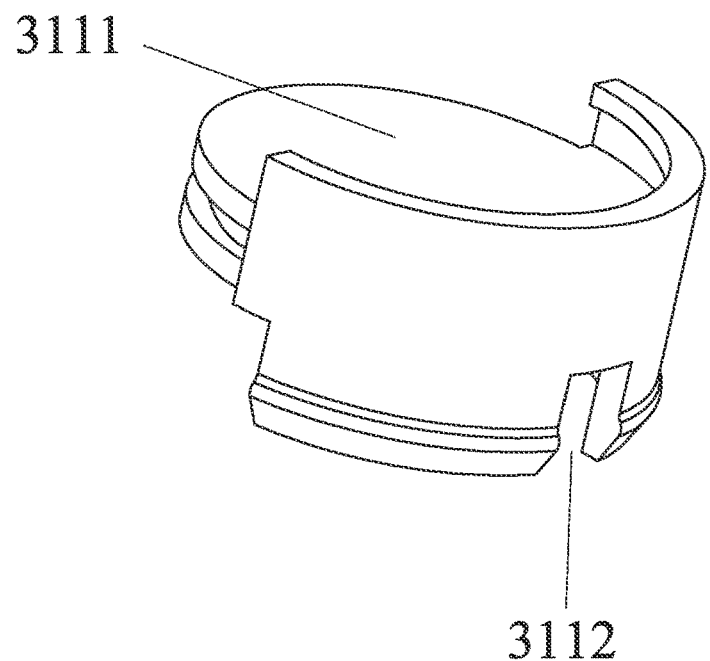
FIG. 8 is another perspective view of the first clamp according to an embodiment of the present disclosure.

Referring to FIGS. 7-8, an upper surface of the disc 3111 is flush with a side wall away from the bristles 201 of the mounting groove 313, and the disc 3111 is also configured to support the mounting piece 202. In particular, the upper surface of the disc 3111 is flush with the side wall away from the bristles 201 of the mounting groove 313 so that when the mounting piece 202 is clamped in the mounting groove 313, the undersurface of the mounting piece 202 is just in contact with the upper surface of the disc 3111. In this way, when the brush head 2 is clamped in the first groove 3131 of the inner wall of the first clamp 311, the presence of the disc 3111 can prevent the mounting piece 202 from being clamped under the first groove 3131 so as to avoid the clamping dislocation.

Referring to FIG. 2, the mounting piece 202 is round and the sleeve 320 is cylindrical. In particular, if the first clamp 311 doesn't enjoy the disc 3111, the first clamp 311 and the second clamps 312 are enclosed as a cylinder.

Referring to FIG. 2, a first section 11 and a second section 12 are integrally formed as the handle 1; the first section 11 is thicker than the second section 12; the first section 11 is removably connected with the sleeve 320, and the second section 12 is cylinder shaped or in truncated con; an outer diameter of the second section is less than a minimum inner diameter of the sleeve 320, and a height of the second section 12 is greater than a height of the sleeve 320. An outer diameter of the first section 11 gradually decreases from the end away from the second section 12 to an end connected to the second section 12, and there is a smooth transition between the first section 11 and the first section 12; in this embodiment, the second section 12 is in truncated cone shape, and the second section 12 gradually decreases from the end connected to the first section 11 to another end; a maximum outer diameter of the second section 12 is less than the minimum inner diameter of the sleeve 320. In another embodiment, the second section 12 can be cylindrical.

In particular, owing to the outer diameter of the second section 12 is less than the minimum inner diameter of the sleeve 320, when the elastic piece 330 and the clamping assembly 310 are going to be removed from the sleeve 320, the handle 1 can be removed from the sleeve 320 first, then the second section 12 of handle 1 is penetrated into the sleeve 320 to push against the disc 3111 so that the elastic piece 330 and the clamping assembly can be pushed from the sleeve 320. In this way, the elastic piece 330 and the clamping assembly 310 can be removed without pulling the brush head 2; on the one hand, it is not necessary to pull the brush head 2 so as to avoid damaging the bristles 201 of the brush head 2; on the other hand, the disc 3111 is pushed again by the second section 12 of the handle 1 which is more convenient to apply force so that the elastic piece 330 and the clamping assembly 310 are pushed from the sleeve 320 more easily. In addition, owing to the arrangement of the disc 3111, the second section 12 of the handle 1 pushes against the disc 3111 rather than directly pushes against the mounting piece 202 of the brush head 2, which further avoids damaging the brush head 2.

Figure 5:
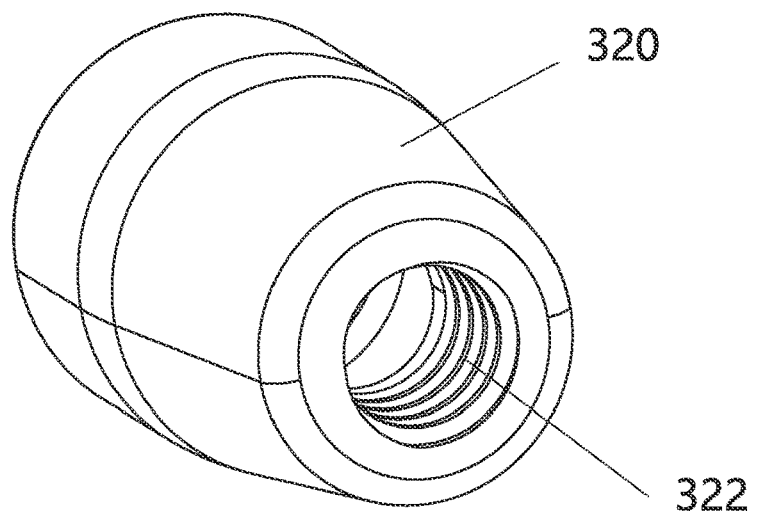
FIG. 5 is a bottom-up perspective view of the connecting piece according to an embodiment of the present disclosure.

Referring to FIGS. 2 and 5, a top end of the handle 1 is provided with external screw thread 111, and the lower end of the sleeve 320 is provided with internal screw thread 322; the external screw thread 111 of the handle 1 are compatible with the internal screw thread 322 of the sleeve 320; the handle 1 is threadedly connected with the sleeve 320 through the external screw thread 111 and the internal screw thread 322 so as to realize the removable connection between the handle 1 and the sleeve 320.

Referring to FIG. 2, the top end of the handle 1 is provided with a column 110, and the external screw thread 111 is located on the outer side wall of the column 110.

Referring to FIG. 2, the column 110 is sleevedly provided with an O-ring 4. When the handle 1 is threadedly connected with the sleeve 320, the O-ring 4 is pressed tightly, enabling the sealing between the handle 1 and the sleeve 320.

In another embodiment, the sleeve 320 is clamped with the handle 1. The end of the sleeve 320 penetrating into the handle 1 is provided with a clamping section, and the clamping section is clamped with the handle 1. In particular, the clamping section of the sleeve 320 is penetrated into the handle 1 to be clamped in the handle 1.

Referring to FIGS. 1-9, the principle of the invention is as follows.

The brush head 2 includes the bristles 201 and the mounting piece 202, and the clamping assembly 310 includes the first clamp 311 and the second clamp 312; the first clamp 311 and the second clamp 312 are connected to form an enclosed structure; the top end of the first clamp 311 and the top end of the second clamp 312 are each provided with the first groove 3131, and the first groove 3131 on the inner wall of the first clamp is configured to form a circular mounting groove 313 with the first groove 3131 on the inner wall of the second clamp; the mounting piece 202 is clamped in the mounting groove 313, in this way, the brush head 2 can be arranged on the clamping assembly 310 without using glue;

the inner side of the upper end of the sleeve 320 is provided with the second groove 321; the lower end of the first clamp 311 and the lower end of the second clamp 312 are provided with the elastic piece 330, and the outer side of the elastic piece 330 is provided with the protrusion 331; the protrusion 331 is clamped in the second groove 321 of the connecting piece 3, and the clamping assembly 310 is arranged on the sleeve 320 to facilitate to replace the brush head 2;

the lower end of the sleeve 320 is provided with the internal screw thread, the top end of the handle 1 is provided with the external screw thread 111, the handle 1 is arranged on the sleeve 320 through the screw thread so that the handle 1 is easy to be replaced.

Figure 10:
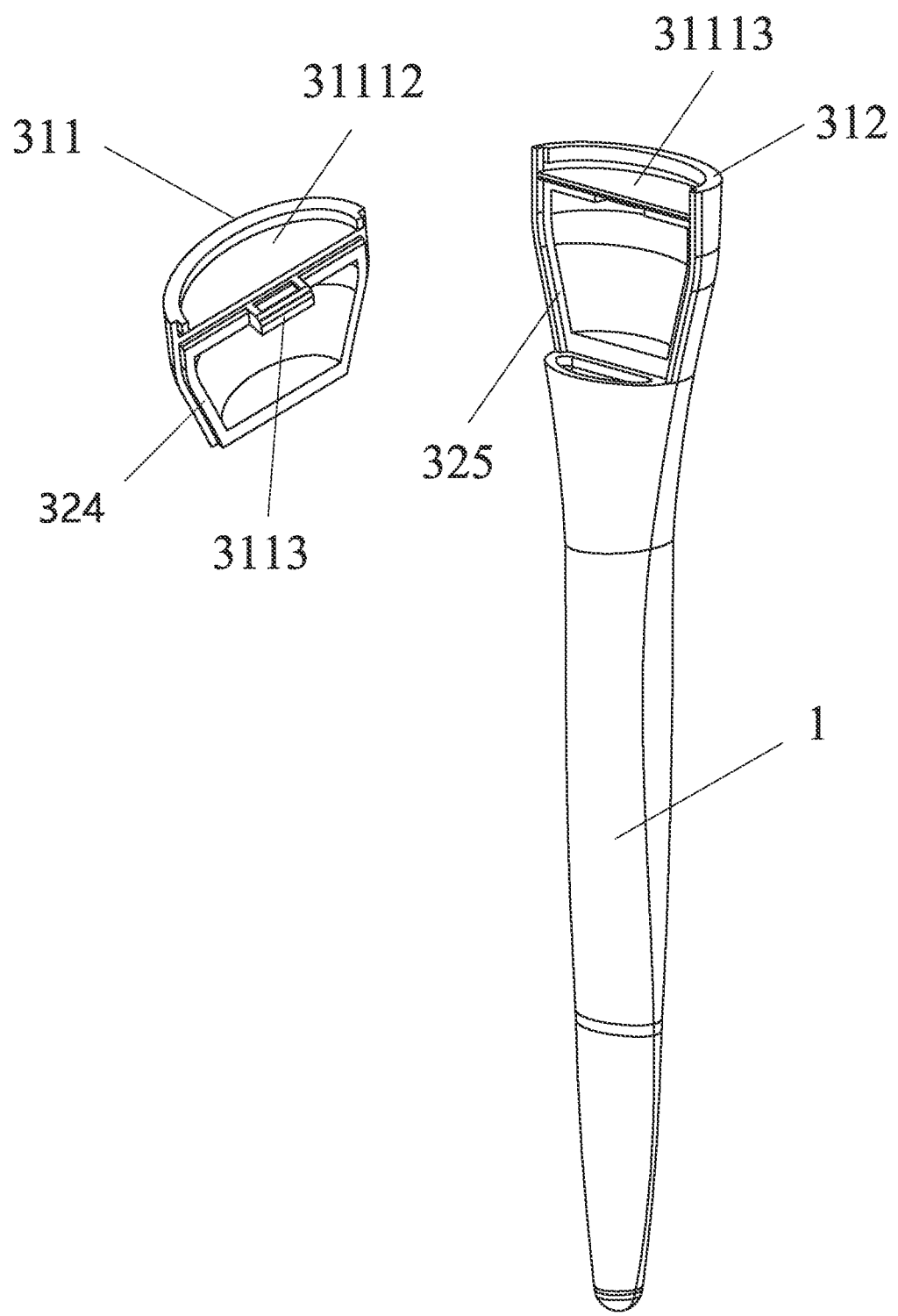
FIG. 10 schematically shows connection between the handle and the connecting piece according to an embodiment of the present disclosure.
Figure 11:
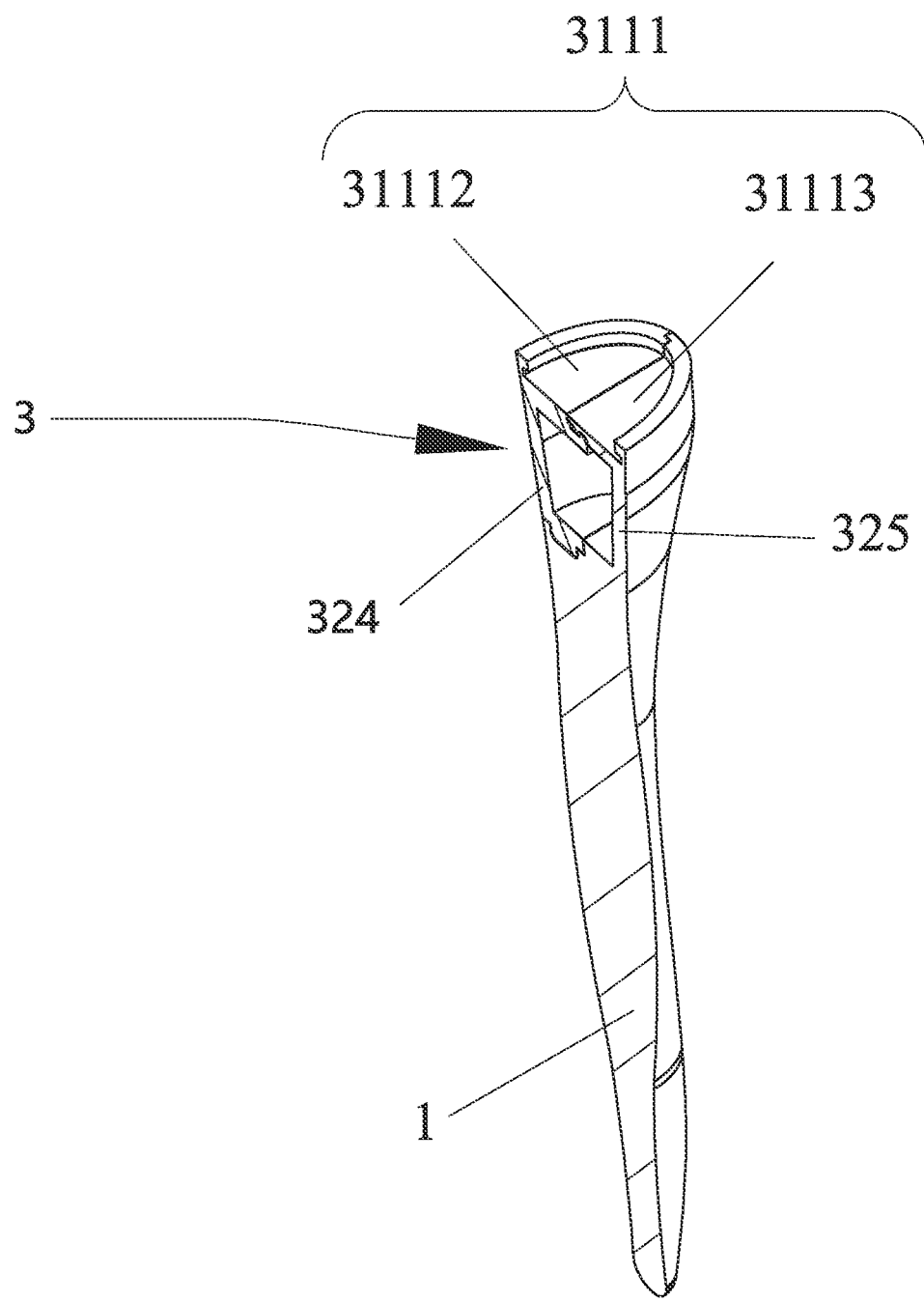
FIG. 11 is a sectional view of connection between the handle and the connecting piece according to an embodiment of the present disclosure.

Referring to FIGS. 10-11, the sleeve 320 includes the first sub-sleeve 324 and the second sub-sleeve 325, the first sub-sleeve 324 and the second sub-sleeve 325 are removably connected to form an enclosed structure; the first sub-sleeve 324 and the first clamp 311 are integrally formed, and the second sub-sleeve 325 and the second clamp 312 are integrally formed.

In particular, the inner wall of the first sub-sleeve 324 and the inner wall of the second sub-sleeve 325 are provided with inner screw thread 322; after the first sub-sleeve 324 and the second sub-sleeve 325 are clamped together, the internal screw thread 322 of the first sub-sleeve 324 and the internal screw thread 322 of the second sub-sleeve 325 are formed as the whole internal screw thread so that they can be compatible with the external screw thread 111 of the handle 1. Or after the first sub-sleeve 324 and the second sub-sleeve 325 are clamped together, they are inserted in the handle 1.

Referring to FIGS. 10-11, the disc 3111 includes the first sub-disc 31112 and the second sub-disc 31113; the first sub-disc 31112 and the first clamp 311 are integrally formed, and the second sub-disc 31113 and the second clamp 312 are integrally formed; the first sub-disc 31112 and the second sub-disc 31113 are removably clamped. In particular, the first sub-disc 31112 is provided with a clamping section 3113, and the first sub-disc 31112 is clamped with the second sub-disc 31113 through the clamping section 3113, in this way, the clamping between the integrally formed first sub-sleeve 324, the first clamp 311, the first sub-disc 31112 and the integrally formed second sub-sleeve 325, the second clamp 312, the second sub-disc 3113 can be realized. In particular, in this embodiment, it can be regarded that the first clamp 311 and the second clamp 312 are omitted, which is equivalent to the first sub-disc 31112 and the first sub-sleeve 324 are directly integrally formed and the second sub-disc 31113 and the second sub-sleeve 325 are directly integrally formed. In another embodiment, the first clamp 311 and the second clamp 312 are omitted, and the first sub-disc 31112 and the first sub-sleeve 324 are integrally formed and the second sub-disc 31113 and the second sub-sleeve 325 are integrally formed.

Figure 12:
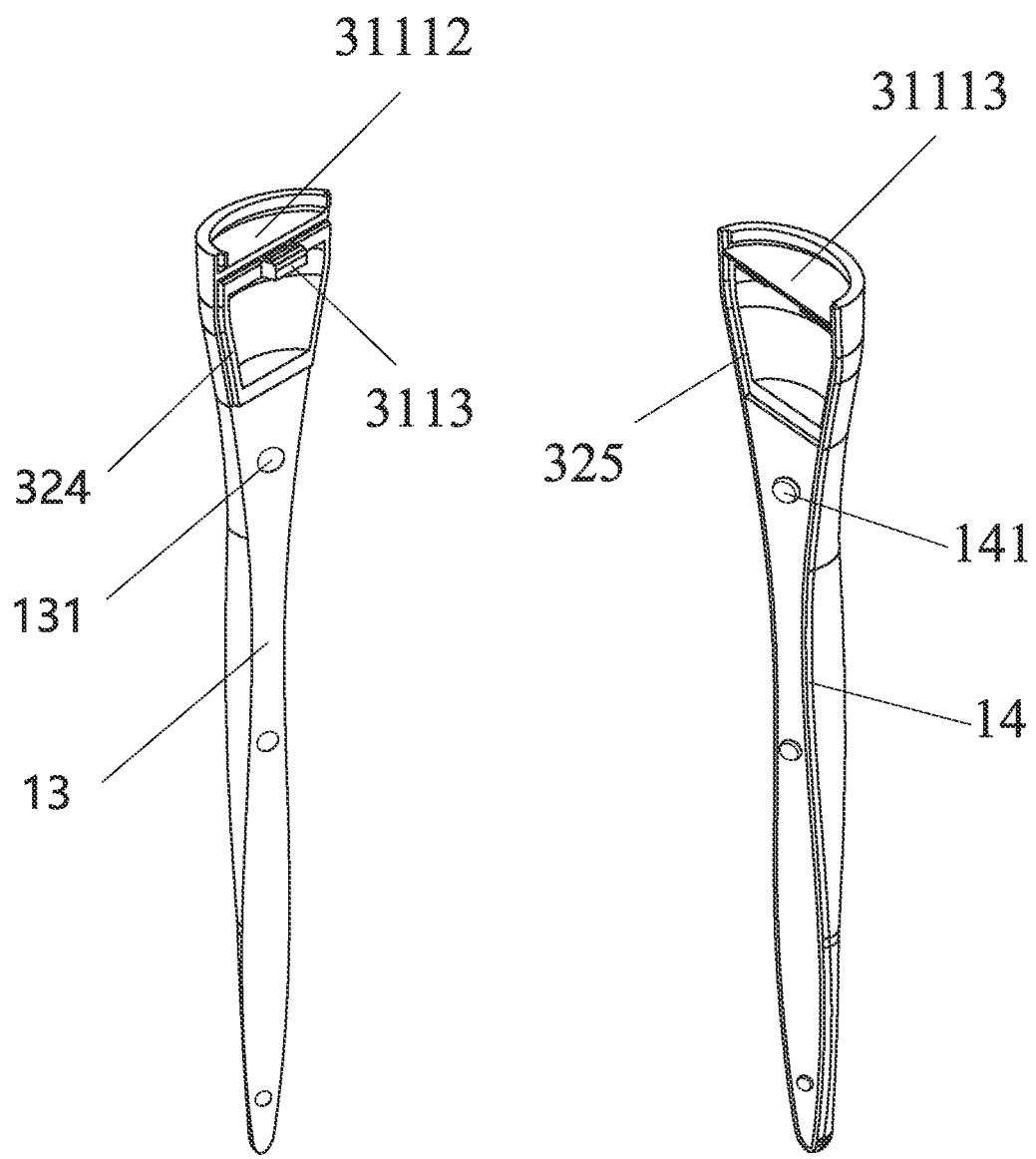
FIG. 12 schematically shows connection between the handle and the connecting piece according to another embodiment of the present disclosure.
Figure 13:
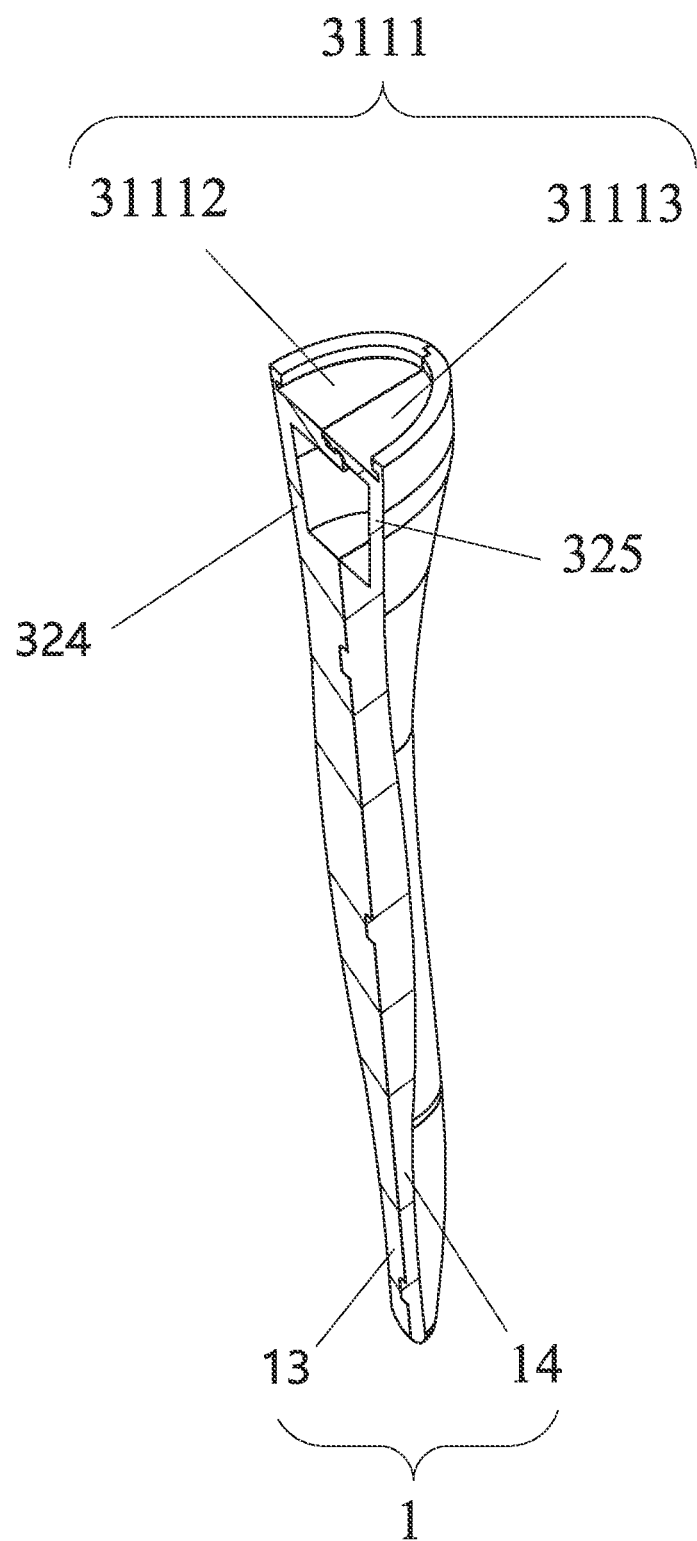
FIG. 13 is a sectional view of connection between the handle and the connecting piece according to another embodiment of the present disclosure.

Referring to FIGS. 12-13, the second sub-sleeve 325 and the handle 1 are integrally formed, and the first sub-sleeve 324 is inserted in the handle 1. In particular, the top end of the first sub-sleeve 324 is clamped with the second sub-sleeve 325 through the first sub-disc 31112, and the lower end of the first sub-sleeve 324 is inserted in the handle 1 integrally formed with the first sub-sleeve 324 so as to realize the reliable connection between the first sub-sleeve 324 and the second sub-sleeve 325.

Referring to FIGS. 12-13, the handle 1 includes the first handle portion 13 and the second handle portion 14; the first handle portion 13 and the second handle portion 14 are removably enclosed; the first sub-sleeve 324 and the first handle portion 13 are integrally formed and the second sub-sleeve 325 and the second handle portion 14 are integrally formed.

Referring to FIG. 12-13, the first handle portion 13 is provided with clamping holes 131, and the second handle portion 14 is provided with clamping columns 141. The clamping columns 141 of the second handle portion 14 is penetrated the clamping hole 131 of the first handle portion 13 in order to realize the clamping between the first handle portion 13 and the second handle portion 14.

Referring to FIG. 12, multiple clamping columns 141 are arranged spaced apart on the second handle portion 14. The number of the clamping holes 131 is the same as the number of the clamping columns 141. The clamping holes 131 are arranged spaced apart on the first handle portion 13, and are in one-to-one correspondence with the clamping columns 141.

Referring to FIGS. 1-9, the clamping assembly 310 is configured in a split-type structure, that is, the clamping assembly 310 is divided into two halves. Referring to FIGS. 10-11, the clamping assembly 310 and the sleeve 320 are both designed in a split-type structure, which means the whole connecting piece 3 is designed in a split-type structure, and is divided into two halves. Referring to FIGS. 12-13, the combination clip 310, the taper tube 320 and the brush handle 1 are set as the split structure schemes, which means the brush handle 1 and the connected piece 3 are divided into two halves at the same time.

Described above are only preferred embodiments of this application, and are not intended to limit the scope of this application. It should be noted that various modifications, replacements and variations made by those skilled in the art without departing from the spirit of this application shall fall within the scope of this application defined by the appended claims.

What is claimed is:

1. A makeup brush, comprising:
a handle;
a brush head; and
a connecting piece;
wherein the brush head comprises bristles and a mounting piece; and the bristles are provided on the mounting piece;
the connecting piece is configured to connect the brush head with the handle; and the mounting piece is in snap-fit connection with the connecting piece;
the connecting piece comprises a clamping assembly and a sleeve; the clamping assembly is arranged in the sleeve; the mounting piece is in snap-fit connection with an upper end of the clamping assembly; and an end of the sleeve away from the mounting piece is removably connected with the handle;
wherein the clamping assembly comprises a first clamp and a second clamp, and the first clamp and the second clamp are removably connected to form an enclosed structure; an inner sidewall of the first clamp and an inner sidewall of the second clamp are each provided with a first groove; the first groove on the inner side wall of the first clamp is configured to form a circular mounting groove with the first groove on the inner side wall of the second clamp; and the mounting piece is clamped in the circular mounting groove;
a lower end of the first clamp and a lower end of the second clamp are each provided with an elastic piece; an outer side wall of the elastic piece is provided with a protrusion; an inner side wall of the sleeve is provided with a second groove; and the protrusion is clamped in the second groove; and the inner side wall of the first clamp is connected with a disc, and a side wall of the disc is provided with a third groove; the inner side wall of the second clamp is provided with a convex ring fitting the third groove; and the convex ring is clamped in the third groove.

2. The makeup brush of claim 1, wherein the lower end of the first clamp and the lower end of the second clamp are each provided with a notch running through the elastic piece; and the notch is configured to increase an elasticity of a lower end of the clamping assembly and an elasticity of the elastic piece.

3. The makeup brush of claim 1, wherein an upper surface of the disc is flush with a side wall of the circular mounting groove away from the bristles; and the disc is configured to support the mounting piece.

4. The makeup brush of claim 1, wherein the handle comprises a first section and a second section; the first section is thicker than the second section; the first section and the second section are integrally formed; the first section is removably connected with the sleeve; the second section is cylindrical or in a truncated cone shape; an outer diameter of the second section is less than a minimum inner diameter of the sleeve; and a height of the second section is greater than a height of the sleeve.

5. The makeup brush of claim 1, wherein a top end of the handle is provided with an external screw thread, and a lower end of the sleeve is provided with an internal screw thread fitting the external screw thread; and the handle and the sleeve are threadedly connected through the external screw thread and the internal screw thread.

6. A makeup brush, comprising:
a handle;
a brush head; and
a connecting piece;
wherein the brush head comprises bristles and a mounting piece; and the bristles are provided on the mounting piece;
the connecting piece is configured to connect the brush head with the handle; and the mounting piece is in snap-fit connection with the connecting piece;
the connecting piece comprises a clamping assembly and a sleeve; the clamping assembly is arranged in the sleeve; the mounting piece is in snap-fit connection with an upper end of the clamping assembly; and an end of the sleeve away from the mounting piece is removably connected with the handle;
wherein the clamping assembly comprises a first clamp and a second clamp, and the first clamp and the second clamp are removably connected to form an enclosed structure; an inner sidewall of the first clamp and an inner sidewall of the second clamp are each provided with a first groove; the first groove on the inner side wall of the first clamp is configured to form a circular mounting groove with the first groove on the inner side wall of the second clamp; and the mounting piece is clamped in the circular mounting groove; and
the sleeve comprises a first sub-sleeve and a second sub-sleeve; the first sub-sleeve and the second sub-sleeve are removably connected to form an enclosed structure; the first sub-sleeve and the first clamp are integrally formed; and the second sub-sleeve and the second clamp are integrally formed.

7. The makeup brush of claim 6, wherein the second sub-sleeve and the handle are integrally formed, and the first sub-sleeve is insertedly connected with the handle.

8. The makeup brush of claim 6, wherein the handle comprises a first handle portion and a second handle portion; the first handle portion and the second handle portion are removably connected to form an enclosed structure; the first sub-sleeve and the first handle portion are integrally formed; and the second sub-sleeve and the second handle portion are integrally formed.

\* \* \* \* \*